United States Patent
Shimomura et al.

(10) Patent No.: US 10,966,244 B2
(45) Date of Patent: Mar. 30, 2021

(54) TERMINAL DEVICE, BASE STATION DEVICE, WIRELESS COMMUNICATION SYSTEM, AND WIRELESS COMMUNICATION METHOD

(71) Applicant: FUJITSU LIMITED, Kawasaki (JP)

(72) Inventors: Tsuyoshi Shimomura, Yokohama (JP); Yoshinori Tanaka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/968,322

(22) Filed: May 1, 2018

(65) Prior Publication Data

US 2018/0255579 A1 Sep. 6, 2018

Related U.S. Application Data

(63) Continuation of application No. PCT/JP2015/081908, filed on Nov. 12, 2015.

(51) Int. Cl.
*H04W 74/08* (2009.01)
*H04W 16/14* (2009.01)
*H04W 72/04* (2009.01)

(52) U.S. Cl.
CPC ....... *H04W 74/0808* (2013.01); *H04W 74/08* (2013.01); *H04W 74/0833* (2013.01); *H04W 16/14* (2013.01); *H04W 72/04* (2013.01); *H04W 72/0446* (2013.01)

(58) Field of Classification Search
CPC . H04W 16/14; H04W 72/04; H04W 72/0446; H04W 74/0808; H04W 74/0833; H04W 74/08–0866; H04W 72/1205; H04W 72/1273; H04W 72/1284; H04W 72/1289; H04W 72/14; H04W 74/0816
See application file for complete search history.

(56) References Cited

U.S. PATENT DOCUMENTS

| 8,996,077 B2 * | 3/2015 | Dalsgaard ............. H04L 1/0027 370/338 |
| 9,426,826 B1 * | 8/2016 | Oroskar ................. H04W 4/08 |
| 2005/0227645 A1 | 10/2005 | Sudo |

(Continued)

FOREIGN PATENT DOCUMENTS

| EP | 3 110 181 A1 | 12/2016 |
| EP | 3 131 343 A1 | 2/2017 |

(Continued)

OTHER PUBLICATIONS

International Search Report issued for corresponding International Patent Application No. PCT/JP2015/081908, dated Feb. 2, 2016, with an English translation.

(Continued)

*Primary Examiner* — Dung B Huynh
(74) *Attorney, Agent, or Firm* — Myers Wolin, LLC

(57) ABSTRACT

A terminal device includes a processor and a memory connected to the processor, wherein the processor executes a process including: receiving a resource specifying signal that specifies a random access resource used to transmit a preamble for random access; selecting one preamble from a plurality of preamble candidates previously acquired; and transmitting the selected preamble by using a random access resource arranged in timing based on a reception timing of the resource specifying signal.

8 Claims, 11 Drawing Sheets

(56) References Cited

U.S. PATENT DOCUMENTS

| | | | |
|---|---|---|---|
| 2007/0171889 A1* | 7/2007 | Kwon | H04L 5/0005 370/350 |
| 2009/0305693 A1 | 12/2009 | Shimomura et al. | |
| 2009/0316593 A1* | 12/2009 | Wang | H04W 74/0833 370/252 |
| 2010/0080184 A1* | 4/2010 | Tseng | H04L 1/08 370/329 |
| 2010/0111032 A1* | 5/2010 | Wu | H04W 74/0833 370/331 |
| 2010/0195636 A1* | 8/2010 | Nakashima | H04W 72/12 370/342 |
| 2010/0260079 A1* | 10/2010 | Baldemair | H04W 74/0833 370/280 |
| 2010/0278128 A1* | 11/2010 | Lee | H04W 74/0833 370/329 |
| 2010/0278137 A1* | 11/2010 | Kwon | H04J 13/0059 370/330 |
| 2011/0019619 A1* | 1/2011 | Tseng | H04W 72/1284 370/328 |
| 2011/0128895 A1* | 6/2011 | Sadek | H04W 16/14 370/280 |
| 2011/0200032 A1* | 8/2011 | Lindstrom | H04W 56/0005 370/350 |
| 2012/0003995 A1* | 1/2012 | Ishii | G01S 5/021 455/456.1 |
| 2012/0076042 A1* | 3/2012 | Chun | H04W 72/042 370/252 |
| 2013/0010748 A1* | 1/2013 | Novak | H04W 72/1268 370/330 |
| 2013/0044700 A1* | 2/2013 | Cheng | H04W 74/004 370/329 |
| 2013/0070726 A1* | 3/2013 | Zhang | H04W 56/0045 370/331 |
| 2013/0114574 A1* | 5/2013 | Ng | H04L 5/001 370/336 |
| 2013/0201966 A1* | 8/2013 | Weng | H04W 72/04 370/336 |
| 2013/0223362 A1* | 8/2013 | Alfano | H04W 72/04 370/329 |
| 2013/0250907 A1* | 9/2013 | Li | H04W 74/0833 370/330 |
| 2013/0281076 A1* | 10/2013 | Damnjanovic | H04W 72/0453 455/418 |
| 2013/0343288 A1* | 12/2013 | Ratasuk | H04W 72/1215 370/329 |
| 2014/0016559 A1* | 1/2014 | Jang | H04L 1/1835 370/328 |
| 2014/0079032 A1* | 3/2014 | Bergstrom | H04W 56/0005 370/336 |
| 2014/0086127 A1* | 3/2014 | Kim | H04L 5/001 370/311 |
| 2014/0219185 A1* | 8/2014 | Etemad | H04L 5/0073 370/329 |
| 2015/0009936 A1* | 1/2015 | Quan | H04L 1/189 370/329 |
| 2015/0057011 A1* | 2/2015 | Di Girolamo | H04W 74/0808 455/454 |
| 2015/0085839 A1* | 3/2015 | Bergstrom | H04W 56/0045 370/336 |
| 2015/0181546 A1* | 6/2015 | Freda | H04W 56/0015 370/336 |
| 2015/0223075 A1 | 8/2015 | Bashar et al. | |
| 2015/0365880 A1* | 12/2015 | Malladi | H04L 5/0007 370/312 |
| 2015/0373674 A1* | 12/2015 | Han | H04L 5/001 370/329 |
| 2016/0050667 A1* | 2/2016 | Papasakellariou | H04L 5/0053 370/329 |
| 2016/0066255 A1* | 3/2016 | Marinier | H04W 56/001 370/350 |
| 2016/0073434 A1* | 3/2016 | Zhang | H04W 74/006 370/329 |
| 2016/0088577 A1* | 3/2016 | Cui | H04W 52/54 370/336 |
| 2016/0105913 A1* | 4/2016 | Hakola | H04W 72/0466 370/329 |
| 2016/0135138 A1* | 5/2016 | Hu | H04W 56/0055 370/350 |
| 2016/0135212 A1* | 5/2016 | Wong | H04W 16/14 |
| 2016/0135247 A1* | 5/2016 | Ozturk | H04W 52/0212 455/436 |
| 2016/0165607 A1* | 6/2016 | Hedayat | H04W 72/0453 370/338 |
| 2016/0183305 A1* | 6/2016 | Huang | H04W 74/0833 370/329 |
| 2016/0227565 A1* | 8/2016 | Ghosh | H04W 74/006 |
| 2016/0227579 A1* | 8/2016 | Stacey | H04W 74/0833 |
| 2016/0234861 A1* | 8/2016 | Ye | H04W 74/0833 |
| 2016/0242213 A1* | 8/2016 | Dabeer | H04W 74/0833 |
| 2016/0262185 A1* | 9/2016 | Ghosh | H04W 74/085 |
| 2016/0270121 A1* | 9/2016 | Bergstrom | H04W 74/0833 |
| 2016/0278050 A1* | 9/2016 | Nory | H04W 16/14 |
| 2016/0302076 A1* | 10/2016 | Chou | H04W 16/14 |
| 2016/0309467 A1* | 10/2016 | Yerramalli | H04W 72/0446 |
| 2016/0315675 A1* | 10/2016 | Seok | H04B 7/0452 |
| 2016/0316458 A1* | 10/2016 | Kwon | H04L 27/2601 |
| 2016/0323915 A1* | 11/2016 | Liu | H04W 74/0833 |
| 2016/0330641 A1* | 11/2016 | Zhang | H04W 24/02 |
| 2016/0330757 A1* | 11/2016 | Cherian | H04L 5/0055 |
| 2016/0359653 A1* | 12/2016 | Lee | H04W 74/085 |
| 2016/0360443 A1* | 12/2016 | Hedayat | H04B 7/0452 |
| 2016/0360525 A1* | 12/2016 | Cheng | H04L 5/001 |
| 2017/0006641 A1* | 1/2017 | Dinan | H04W 74/0833 |
| 2017/0013610 A1* | 1/2017 | Lee | H04L 1/00 |
| 2017/0019863 A1* | 1/2017 | Cariou | H04W 52/283 |
| 2017/0041953 A1* | 2/2017 | Zhou | H04W 72/0453 |
| 2017/0048889 A1* | 2/2017 | Kadous | H04W 72/0446 |
| 2017/0064692 A1* | 3/2017 | Kahtava | H04L 27/0006 |
| 2017/0078831 A1* | 3/2017 | Chen | H04W 4/70 |
| 2017/0105229 A1* | 4/2017 | Luo | H04L 5/0044 |
| 2017/0111889 A1* | 4/2017 | Li | H04W 74/0833 |
| 2017/0118776 A1 | 4/2017 | Yasukawa et al. | |
| 2017/0127453 A1* | 5/2017 | Adachi | H04L 5/0055 |
| 2017/0196020 A1* | 7/2017 | Mukherjee | H04W 74/006 |
| 2017/0201998 A1* | 7/2017 | Akiyama | H04W 16/14 |
| 2017/0202007 A1* | 7/2017 | Miao | H04W 72/04 |
| 2017/0202043 A1* | 7/2017 | Seo | H04W 28/08 |
| 2017/0238272 A1* | 8/2017 | You | H04W 52/0212 455/436 |
| 2017/0245306 A1* | 8/2017 | Kim | H04W 72/0413 |
| 2017/0265225 A1* | 9/2017 | Takeda | H04W 16/14 |
| 2017/0272138 A1* | 9/2017 | Chun | H04L 29/08 |
| 2017/0280481 A1* | 9/2017 | Stern-Berkowitz | H04W 74/085 |
| 2017/0366996 A1* | 12/2017 | Park | H04W 48/14 |
| 2017/0367058 A1* | 12/2017 | Pelletier | H04W 56/0045 |
| 2018/0006778 A1* | 1/2018 | Damnjanovic | H04J 11/00 |
| 2018/0007710 A1* | 1/2018 | Tanaka | H04W 72/042 |
| 2018/0014316 A1* | 1/2018 | Guo | H04W 72/1289 |
| 2018/0020483 A1* | 1/2018 | Lee | H04W 56/0055 370/350 |
| 2018/0035465 A1* | 2/2018 | Ahn | H04W 72/12 |
| 2018/0049221 A1* | 2/2018 | Park | H04W 74/08 |
| 2018/0054846 A1* | 2/2018 | Nagasaka | H04W 74/0833 |
| 2018/0098353 A1* | 4/2018 | Lee | H04W 4/08 |
| 2018/0103458 A1* | 4/2018 | Tooher | H04W 16/14 |
| 2018/0124749 A1* | 5/2018 | Park | H04W 16/14 |
| 2018/0124825 A1* | 5/2018 | Lee | H04W 74/04 |
| 2018/0146476 A1* | 5/2018 | Kim | H04W 74/008 |
| 2018/0167882 A1* | 6/2018 | Choi | H04W 52/0216 |
| 2018/0199369 A1* | 7/2018 | Larsson | H04W 74/006 |
| 2018/0213571 A1* | 7/2018 | Wang | H04W 74/0808 |
| 2018/0220457 A1* | 8/2018 | Koorapaty | H04W 74/0808 |
| 2018/0242353 A1* | 8/2018 | Lei | H04W 72/1289 |
| 2018/0242355 A1* | 8/2018 | Lou | H04W 72/121 |
| 2018/0255586 A1* | 9/2018 | Einhaus | H04W 72/0413 |
| 2018/0279340 A1* | 9/2018 | Skordeman | H04W 16/14 |
| 2018/0279372 A1* | 9/2018 | Takeda | H04J 11/00 |
| 2018/0287846 A1* | 10/2018 | Kim | H04L 5/00 |
| 2018/0288683 A1* | 10/2018 | Bendlin | H04W 48/14 |

(56) References Cited

U.S. PATENT DOCUMENTS

| | | | | |
|---|---|---|---|---|
| 2018/0288743 A1* | 10/2018 | Choi | ................... | H04L 27/2602 |
| 2018/0288805 A1* | 10/2018 | Bhorkar | ................ | H04L 5/0048 |
| 2018/0302924 A1* | 10/2018 | Kim | ...................... | H04W 74/08 |
| 2018/0310330 A1* | 10/2018 | Chun | ................... | H04L 5/0053 |
| 2019/0014591 A1* | 1/2019 | Lei | .................... | H04W 72/1289 |
| 2019/0159249 A1* | 5/2019 | Ahn | ...................... | H04W 56/00 |
| 2019/0191429 A1* | 6/2019 | Stern-Berkowitz | .......................... | H04W 56/0045 |
| 2019/0254074 A1* | 8/2019 | Jeon | ................... | H04W 56/001 |

FOREIGN PATENT DOCUMENTS

| | | |
|---|---|---|
| EP | 3 297 386 A1 | 3/2018 |
| JP | 2004-159248 A | 6/2004 |
| JP | 2006-515497 A | 5/2006 |
| JP | 2014-500685 A | 1/2014 |
| JP | 2015-065485 A | 4/2015 |
| JP | 2015-192359 A | 11/2015 |
| WO | 2004/075418 A2 | 9/2004 |
| WO | 2008/081531 A1 | 7/2008 |
| WO | 2012/078565 A1 | 6/2012 |
| WO | 2012/135998 A1 | 10/2012 |
| WO | 2015/125901 A1 | 8/2015 |
| WO | 2015/146638 A1 | 10/2015 |
| WO | 2015/165031 A1 | 11/2015 |

OTHER PUBLICATIONS

Written Opinion of the International Searching Authority issued for corresponding International Patent Application No. PCT/JP2015/081908, dated Feb. 2, 2016, with an English translation.

Extended European search report with supplementary European search report and the European search opinion issued by the European Patent Office for corresponding European Patent Application No. 15908320.3-1215, dated Sep. 28, 2018.

Fujitsu, "MAC impact for supporting UL transmission on LAA SCell", Agenda Item: 7.1.3, 3GPP TSG-RAN WG2 Meeting #89bis, R2-151455, Bratislava, Slovakia, Apr. 20-24, 2015.

Final Notification of Reasons for Refusal issued by the Japan Patent Office for corresponding Japanese Patent Application No. 2017-549945, dated May 28, 2019, with an English translation.

Communication pursuant to Article 94(3) EPC issued for corresponding European Patent Application No. 15 908 320.3, dated Sep. 16, 2019.

Notice of Reasons for Refusal issued by Japan Patent Office for corresponding Japanese patent application No. 2019-176125, dated Oct. 27, 2020, with a full English translation.

Communication pursuant to Article 94(3) EPC issued by the European Patent Office for corresponding European Application No. 15 908 320.3-1215, dated Oct. 9, 2020.

* cited by examiner

TERMINAL DEVICE, BASE STATION DEVICE, WIRELESS COMMUNICATION SYSTEM, AND WIRELESS COMMUNICATION METHOD

CROSS-REFERENCE TO RELATED APPLICATION

This application is a continuation of International Application No. PCT/JP2015/081908, filed on Nov. 12, 2015 and designating the U.S., the entire contents of which are incorporated herein by reference.

FIELD

The present invention relates to a terminal device, a base station device, a wireless communication system, and a wireless communication method.

BACKGROUND

In recent years, traffic has been increasing in wireless communication systems using for example LTE (Long Term Evolution); therefore, there is a demand to take measures so as to contain more traffic and improve communication quality. Thus, there is a consideration on use of the LTE technology in unlicensed bands (Unlicensed band) which are used for wireless LAN (Local Area Network), for example, and for which licenses are not needed.

Specifically, there is a technology called LAA (Licensed Assisted Access) using the LTE technology in unlicensed bands. LAA is a technology for transmitting and receiving data in unlicensed bands by subsidiarily using licensed bands which are used in wireless communication systems, such as mobile telephone networks, and for which licenses are needed.

If the LAA is used, it is considered that control data, and the like, are transmitted and received in for example licensed bands and best-effort user data, and the like, are transmitted and received in unlicensed bands. Furthermore, in order to improve the usage efficiency of frequencies in an unlicensed band, it is preferable that sub-frames for an uplink and a downlink are adaptively arranged in accordance with the amount of traffic in the uplink and the downlink.

Furthermore, for the LTE in licensed bands, if there is data to be transmitted by using an uplink, a terminal device sometimes controls communication with the base station device by using random access. Specifically, the terminal device selects a preamble at random and transmits it to the base station device in order to make a request for scheduling in the uplink and, if a response is received from the base station device, transmits data by using the uplink.

By RRC (Radio Resource Control) signaling, the base station device notifies information on such as a preamble candidate selected by the terminal device or a resource used for transmission of a preamble. Resources for transmission of a preamble, specified by the information, are arranged in a periodically fixed pattern. Therefore, the terminal device selects any preamble from preamble candidates and then transmits the selected preamble by using the periodically arranged resources. Furthermore, this kind of random access is used when, for example, the terminal device is first connected to the base station device, when timing advance (TA) is conducted to adjust timing of transmission from the terminal device in accordance with a propagation delay, or the like.

Patent Literature 1: Japanese National Publication of International Patent Application No. 2014-500685
Patent Literature 2: Japanese National Publication of International Patent Application No. 2006-515497

However, with regard to unlicensed bands, there is a problem in that it is difficult to conduct random access as in LTE. Specifically, unlicensed bands are frequency bands shared by a different wireless communication system such as wireless LAN; therefore, when LAA is performed by using an unlicensed band, LBT (Listen Before Talk) is typically introduced. During LBT, a device, which transmits signals by using an unlicensed band, performs a reception process on the unlicensed band before signals are transmitted so as to check whether the unlicensed band is available. During LBT, as a result of the reception process on the unlicensed band, if the received power is equal to or less than a predetermined value, it is determined that the unlicensed band is available, and transmission is started by using the unlicensed band.

As LBT is conducted in unlicensed bands as described above, it is not practical that resources for transmission of a preamble are periodically arranged as for random access in LTE. Specifically, it is difficult to arrange an LAA sub-frame in an unlicensed band when the unlicensed band is being used by a different wireless communication system as a result of LBT, and resources for transmission of a preamble are not arranged. That is, with regard to unlicensed bands, in terms of equitability with other wireless communication systems, unlicensed bands are not occupied by LAA in a flexible manner, and it is difficult to periodically arrange resources for transmission of a preamble.

Furthermore, even if resources for transmission of a preamble may be periodically arranged in an unlicensed band, the usage efficiency of a frequency in the unlicensed band is sometimes decreased. That is, as described above, it is preferable that sub-frames for the uplink and the downlink are adaptively arranged in accordance with the amount of traffic in order to improve the usage efficiency of frequencies in an unlicensed band. Nevertheless, if resources for transmission of a preamble are periodically arranged as for random access in LTE, sub-frames for the uplink are arranged in fixed timing. As a result, it is difficult to adaptively arrange sub-frames in accordance with the amount of traffic, and the usage efficiency of frequency in unlicensed bands is decreased.

SUMMARY

According to an aspect of an embodiment of the invention, a terminal device includes a processor and a memory connected to the processor. The processor executes a process including: receiving a resource specifying signal that specifies a random access resource used to transmit a preamble for random access; selecting one preamble from a plurality of preamble candidates previously acquired; and transmitting the selected preamble by using a random access resource arranged in timing based on a reception timing of the resource specifying signal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

With reference to drawings, a detailed explanation is given below of an embodiment of a terminal device, a base station device, a wireless communication system, and a wireless communication method disclosed in the subject application. Furthermore, the embodiment is not a limitation on the present invention.

[a] First Embodiment

Figure 1:
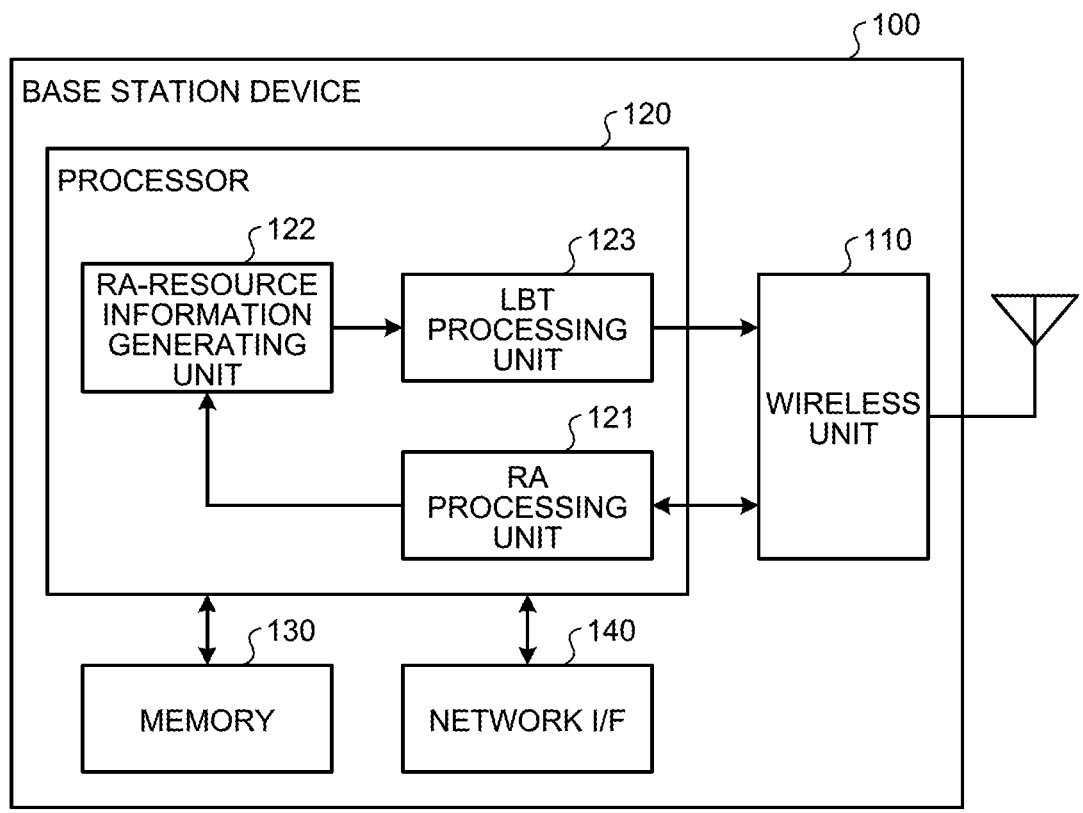
FIG. 1 is a block diagram that illustrates a configuration of a base station device according to a first embodiment.

FIG. 1 is a block diagram that illustrates a configuration of a base station device 100 according to a first embodiment. The base station device 100 illustrated in FIG. 1 includes a wireless unit 110, a processor 120, a memory 130, and a network interface (hereinafter, abbreviated as "network I/F") 140.

The wireless unit 110 is connected to an antenna, and it performs wireless transmission processing on transmission signals output from the processor 120 and wirelessly transmits them via an antenna. Furthermore, the wireless unit 110 performs wireless reception processing on reception signals received via the antenna and outputs them to the processor 120. The wireless unit 110 is capable of transmitting and receiving signals in a licensed band occupied by the wireless communication system to which the base station device 100 belongs and is capable of transmitting and receiving signals in an unlicensed band shared by multiple wireless communication systems.

The processor 120 includes, for example, a CPU (Central Processing Unit), FPGA (Field Programmable Gate Array), or DSP (Digital Signal Processor), and it performs overall control on the wireless unit 110, the memory 130, and the network I/F 140. Furthermore, the processor 120 conducts random access processing in an unlicensed band. Specifically, the processor 120 includes a random-access processing unit (hereafter, abbreviated as "RA processing unit") 121, a random access resource (hereafter, abbreviated as "RA resource") information generating unit 122, and an LBT processing unit 123.

The RA processing unit 121 determines that random access is conducted in an unlicensed band at a predetermined cycle and gives a command to the RA-resource information generating unit 122 so as to transmit RA resource information. Here, the predetermined cycle is determined in accordance with, for example, the number of terminal devices connected to the base station device 100. Furthermore, the transmission timing of RA resource information may be quasi-periodic transmission timing in accordance with an LBT process. The quasi-periodic transmission timing refers to, for example, transmission timing that enables transmission in accordance with a result of a LBT process within a window, windows for transmitting RA resource information being periodically arranged. In such a case where the quasi-periodic transmission timing is followed, the actual transmission timing of RA resource information does not need to be completely periodic. Information about the length of a cycle or the length of a window may be notified by for example RRC signaling, or it may be simultaneously transmitted with RA resource information.

The RA processing unit 121 acquires a preamble transmitted from a terminal device by using the RA resource designated by RA resource information and determines the terminal device for which transmission is allowed in the uplink from the terminal device to the base station device 100. Furthermore, the RA processing unit 121 transmits a random access response (hereafter, abbreviated as "RA response"), which indicates the terminal device for which transmission is allowed, via the wireless unit 110. Here, the RA processing unit 121 conducts timing advance to adjust timing of transmission from the terminal device in accordance with the reception timing of a preamble from the terminal device for which transmission is allowed. That is, the RA processing unit 121 transmits a timing advance command (hereafter, referred to as "TA command") included in a RA response to give a command so as to advance the transmission timing by the amount that corresponds to a propagation delay from the terminal device.

The RA-resource information generating unit 122 generates RA resource information for specifying an RA resource in accordance with a command from the RA processing unit 121. Specifically, the RA-resource information generating unit 122 generates RA resource information that indicates the timing in which a preamble transmitted from the terminal device is received on the basis of the downlink sub-frame including RA resource information and the frequency used for transmission of a preamble in an unlicensed band. Furthermore, the RA-resource information generating unit 122 may generate RA resource information that indicates the number of times RA resources are repeated and the time interval between the RA resources so as to receive preambles transmitted in multiple timings.

Figure 2:
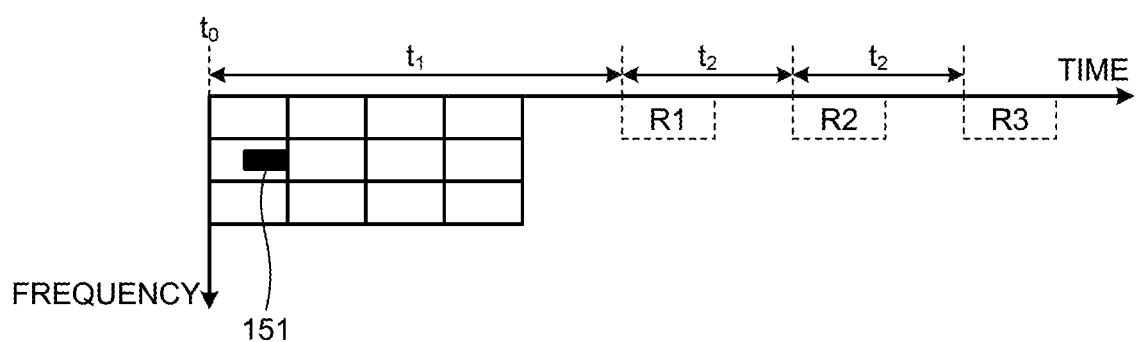
FIG. 2 is a diagram that illustrates a specific example of arrangement of RA resources according to the first embodiment.

Here, the RA resource is a resource that is made up of a time and a frequency and that is used by a terminal device to transmit a preamble. Therefore, as illustrated in FIG. 2, for example, RA resources R1, R2, and R3 are allocated in a frequency within an unlicensed band in timings based on time $t_0$ at the beginning of the sub-frame for transmitting RA resource information 151. In FIG. 2, the RA resource R1 is allocated after time $t_1$ from the time $t_0$, and each of the RA resources R2 and R3 is allocated with an interval of the time $t_2$ after the RA resource R1. Therefore, the RA resource information 151 includes information on the time $t_1$ and $t_2$, information on the frequency of the RA resources R1, R2, and R3, and the like. Furthermore, the time length of each of the RA resources R1, R2, and R3 may be, for example, the length of one sub-frame.

After the RA-resource information generating unit 122 generates RA resource information, the LBT processing unit 123 performs an LBT process to check availability of an unlicensed band. Specifically, the LBT processing unit 123 performs a reception process on an unlicensed band to determine whether the received power is equal to or less than a predetermined threshold. Then, if the received power is continuously equal to or less than the predetermined threshold during more than a predetermined time period, the LBT processing unit 123 determines that an unlicensed band is available and transmits RA resource information with a downlink sub-frame. That is, the LBT processing unit 123 transmits a resource specifying signal that includes RA resource information. Furthermore, if an unlicensed band is already being used by the wireless communication system to which the base station device 100 belongs, the LBT processing unit 123 may transmit a resource specifying signal that includes RA resource information without performing LBT.

The memory 130 includes for example a RAM (Random Access Memory) or a ROM (Read Only Memory), and it stores information used during operation of the processor 120.

The network I/F 140 is an interface connected to a higher-level network or other base station devices with wire.

Figure 3:
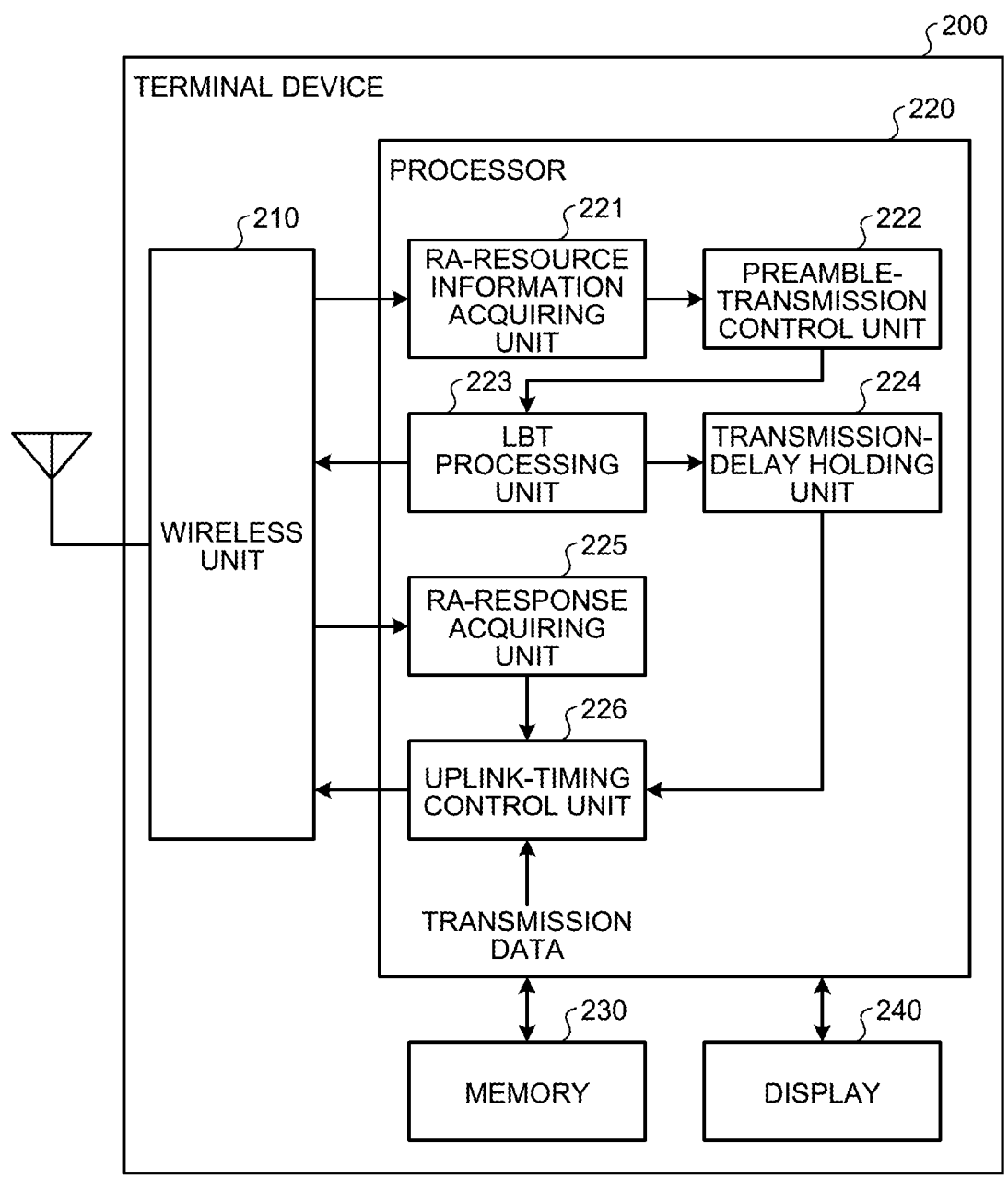
FIG. 3 is a block diagram that illustrates a configuration of a terminal device according to the first embodiment.

FIG. 3 is a block diagram that illustrates a configuration of a terminal device 200 according to the first embodiment. The terminal device 200 illustrated in FIG. 3 includes a wireless unit 210, a processor 220, a memory 230, and a display 240.

The wireless unit 210 is connected to an antenna, and it performs wireless reception processing on reception signals received via the antenna and outputs them to the processor 220. Furthermore, the wireless unit 210 performs wireless transmission processing on transmission signals output from the processor 220 and wirelessly transmits them via the antenna. The wireless unit 210 is capable of transmitting and receiving signals in a licensed band occupied by the wireless communication system to which the terminal device 200 belongs and is capable of transmitting and receiving signals in an unlicensed band shared by multiple wireless communication systems.

The processor 220 includes, for example, a CPU, FPGA, or DSP, and it performs overall control on the wireless unit 210, the memory 230, and the display 240. Furthermore, the processor 220 performs random access processing in an unlicensed band. Specifically, the processor 220 includes an RA-resource information acquiring unit 221, a preamble-transmission control unit 222, an LBT processing unit 223, a transmission-delay holding unit 224, an RA-response acquiring unit 225, and an uplink-timing control unit 226.

The RA-resource information acquiring unit 221 acquires RA resource information from unlicensed-band signals received by the wireless unit 210 if for example there is data to be transmitted by using the uplink in the unlicensed band. That is, the RA-resource information acquiring unit 221 acquires RA resource information that is transmitted from the base station device 100 at a predetermined cycle. The RA resource information indicates the time until the timing of an RA resource based on a downlink sub-frame including RA resource information and the frequency used as an RA resource in an unlicensed band.

The preamble-transmission control unit 222 controls transmission of a preamble for random access in accordance with RA resource information acquired by the RA-resource information acquiring unit 221. Specifically, the preamble-transmission control unit 222 selects one preamble at random from preamble candidates notified by for example RRC signaling. Then, the preamble-transmission control unit 222 gives a command to the LBT processing unit 223 so as to transmit the selected preamble by using the RA resource indicated by the RA resource information.

Prior to transmission of signals by using an unlicensed band, the LBT processing unit 223 performs a reception process on an unlicensed band to determine whether a different wireless communication system is using the unlicensed band. Specifically, if the received power in the unlicensed band is equal to or more than the predetermined threshold, the LBT processing unit 223 determines that the unlicensed band is being used by a different wireless communication system, i.e., busy state. Conversely, if the received power in the unlicensed band is less than the predetermined threshold, the LBT processing unit 223 determines that the unlicensed band is not being used by different wireless communication systems, i.e., idle state. Furthermore, if the idle state continues for a predetermined time period, the LBT processing unit 223 starts transmission of signals by using the unlicensed band.

After the preamble-transmission control unit 222 gives a command so as to transmit a preamble, the LBT processing unit 223 determines whether an unlicensed band is in a busy state or an idle state. Then, if an idle state continues for a predetermined time period, the LBT processing unit 223 transmits the preamble, for which the preamble-transmission control unit 222 has given a command, via the wireless unit 210. At this time, the LBT processing unit 223 notifies the transmission-delay holding unit 224 of a transmission delay from the beginning of the RA resource indicated by the RA resource information to actual transmission of the preamble. That is, the LBT processing unit 223 notifies the transmission-delay holding unit 224 of a transmission delay after an idle state of the unlicensed band continues for a predetermined time period and transmission of a preamble becomes enabled.

Figure 4:
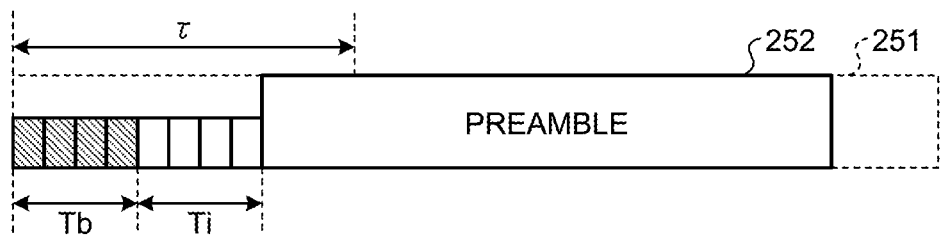
FIG. 4 is a diagram that illustrates a specific example of preamble transmission timing.

Specifically, it is assumed that, as illustrated in FIG. 4, for example, after a busy state continues for a time Tb from the beginning of an RA resource 251 indicated by RA resource information, an idle state continues for a time Ti and then a preamble 252 is transmitted. In this case, the sum of the time Tb and the time Ti is notified as a transmission delay to the transmission-delay holding unit 224. Furthermore, if the RA resource information includes information on the maximum allowable delay τ, the LBT processing unit 223 transmits the preamble 252 only when a transmission delay is equal to or less than the maximum allowable delay τ. In other words, if transmission of a preamble is not enabled after the maximum allowable delay τ is exceeded, the LBT processing unit 223 cancels transmission of a preamble. Here, the maximum allowable delay τ is determined in consideration of the guard period length to prevent interference between sub-frames, the timing adjustment capability of the base station device 100, and the like, in addition to the time length of the RA resource 251 and the time length of the preamble 252.

With reference back to FIG. 3, the transmission-delay holding unit 224 holds a transmission delay from the timing of the beginning of the RA resource to the actual transmission of a preamble by the LBT processing unit 223. That is, the transmission-delay holding unit 224 holds a transmission delay for transmission of a preamble that occurs due to an LBT process.

After transmission of the preamble is completed, the RA-response acquiring unit 225 acquires an RA response from signals of the unlicensed band, received by the wireless unit 210. That is, the RA-response acquiring unit 225 acquires an RA response with which the base station device 100 that has received the preamble allows any terminal device to conduct transmission in an uplink.

The uplink-timing control unit 226 refers to the RA response by using the RA-response acquiring unit 225 to determine whether transmission by the terminal device 200 is allowed and, if transmission is allowed, controls the transmission timing of transmission data. Specifically, the uplink-timing control unit 226 acquires a timing advance command (TA command) included in an RA response and transmits transmission data in delayed timing after the transmission timing designated by the TA command is delayed by the transmission delay held by the transmission-delay holding unit 224.

TA commands designate the transmission timing of the terminal device 200 based on the reception timing of a preamble by the base station device 100. However, the reception timing of a preamble by the base station device 100 is delayed by not only a propagation delay between the terminal device 200 and the base station device 100 but also by a transmission delay for an LBT process by the LBT processing unit 223. Therefore, if transmission data is transmitted at the transmission timing that follows the TA command, the transmission data is transmitted at excessively early timing by the transmission delay of the LBT process. Therefore, the uplink-timing control unit 226 delays the transmission timing designated by a TA command by the transmission delay that is held by the transmission-delay holding unit 224.

The memory 230 includes, for example, a RAM or a ROM, and it stores information used for operation by the processor 220.

The display 240 includes, for example, a liquid crystal panel, and it displays various types of information in accordance with commands from the processor 220. The display 240 may present the type of communication indicating, for example, whether it is in the middle of communication using a licensed band or in the middle of communication using an unlicensed band.

Figure 5:
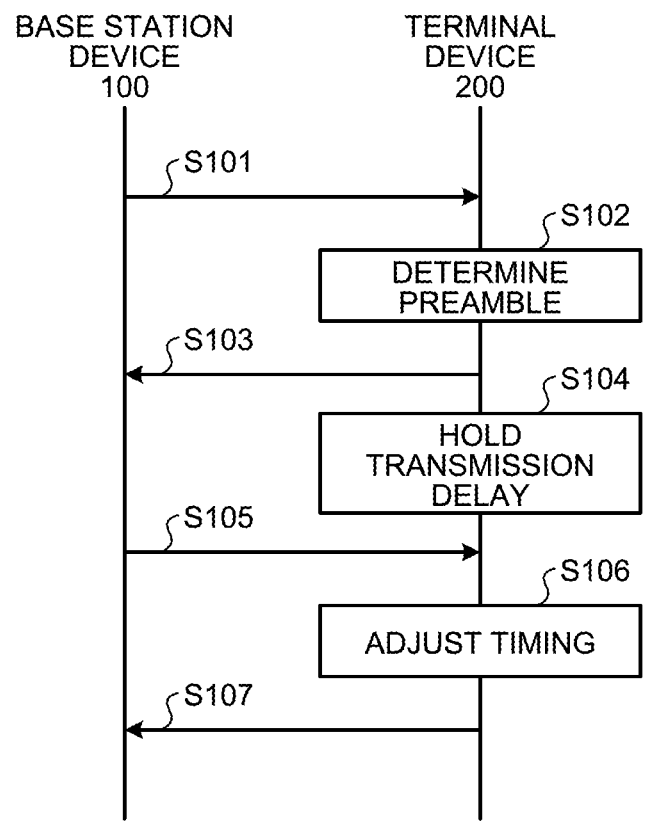
FIG. 5 is a sequence diagram that illustrates a wireless communication process according to the first embodiment.

Next, with reference to the sequence diagram illustrated in FIG. 5, an explanation is given of a wireless communication process by the base station device 100 and the terminal device 200 that are configured as described above. FIG. 5 illustrates a wireless communication process when the terminal device 200 uses the uplink in an unlicensed band to transmit data. Therefore, in the following explanation, wireless communications between the base station device 100 and the terminal device 200 are conducted by using an unlicensed band if not otherwise specified.

In accordance with a command from the RA processing unit 121 in the base station device 100, RA resource information generated by the RA-resource information generating unit 122 is periodically transmitted (Step S101). When there occurs transmission data to be transmitted in the uplink, the terminal device 200 receives RA resource information and the RA-resource information acquiring unit 221 acquires the RA resource information. Then, the preamble-transmission control unit 222 determines a preamble at random from preamble candidates that are previously notified (Step S102). The determined preamble is notified to the LBT processing unit 223, and the preamble is transmitted by the LBT processing unit 223 by using the RA resource indicated by the RA resource information (Step S103). That is, in the timing of the RA resource, the preamble is transmitted by using the frequency of the RA resource. The timing of the RA resource is a timing based on the beginning of a downlink sub-frame including RA resource information.

For transmission of a preamble using an RA resource, an LBT process is performed by the LBT processing unit 223 and, if the idle state of an unlicensed band continues for a predetermined time period, a preamble is transmitted. For this reason, the timing in which a preamble is actually transmitted is timing after the beginning of the RA resource. Therefore, a transmission delay from the beginning of the RA resource to actual transmission of a preamble is notified to the transmission-delay holding unit 224 by the LBT processing unit 223 and it is held (Step S104).

The base station device 100 receives a preamble transmitted from the terminal device 200, and the RA processing unit 121 selects the terminal device for which transmission is allowed from the terminal devices that have transmitted a preamble. Then, the RA processing unit 121 transmits an RA response indicating the terminal device for which transmission is allowed (Step S105). The RA response includes a TA command that gives a command to advance the transmission timing by the amount that corresponds to a propagation delay. Furthermore, it is assumed here that the transmitted RA response indicates that transmission from the terminal device 200 is allowed.

RA responses transmitted from the base station device 100 are received by the terminal device 200 and acquired by the RA-response acquiring unit 225. Then, the uplink-timing control unit 226 checks that transmission from the terminal device 200 is allowed in accordance with the RA response and then adjusts the transmission timing of the transmission data (Step S106). Specifically, the transmission timing indicated by the TA command included in the RA response is delayed by the transmission delay that is held by the transmission-delay holding unit 224, and the delayed timing is set as transmission timing. Then, the transmission data is transmitted at this transmission timing (Step S107).

As described above, as a preamble is transmitted by using an RA resource in timing based on a downlink sub-frame including RA resource information, random access may be executed without periodically allocating RA resources. Furthermore, as the transmission timing of transmission data is adjusted in consideration of a transmission delay that occurs due to an LBT process during transmission of a preamble, it is possible to prevent the transmission timing from being excessively advanced due to timing advance.

Figure 6:
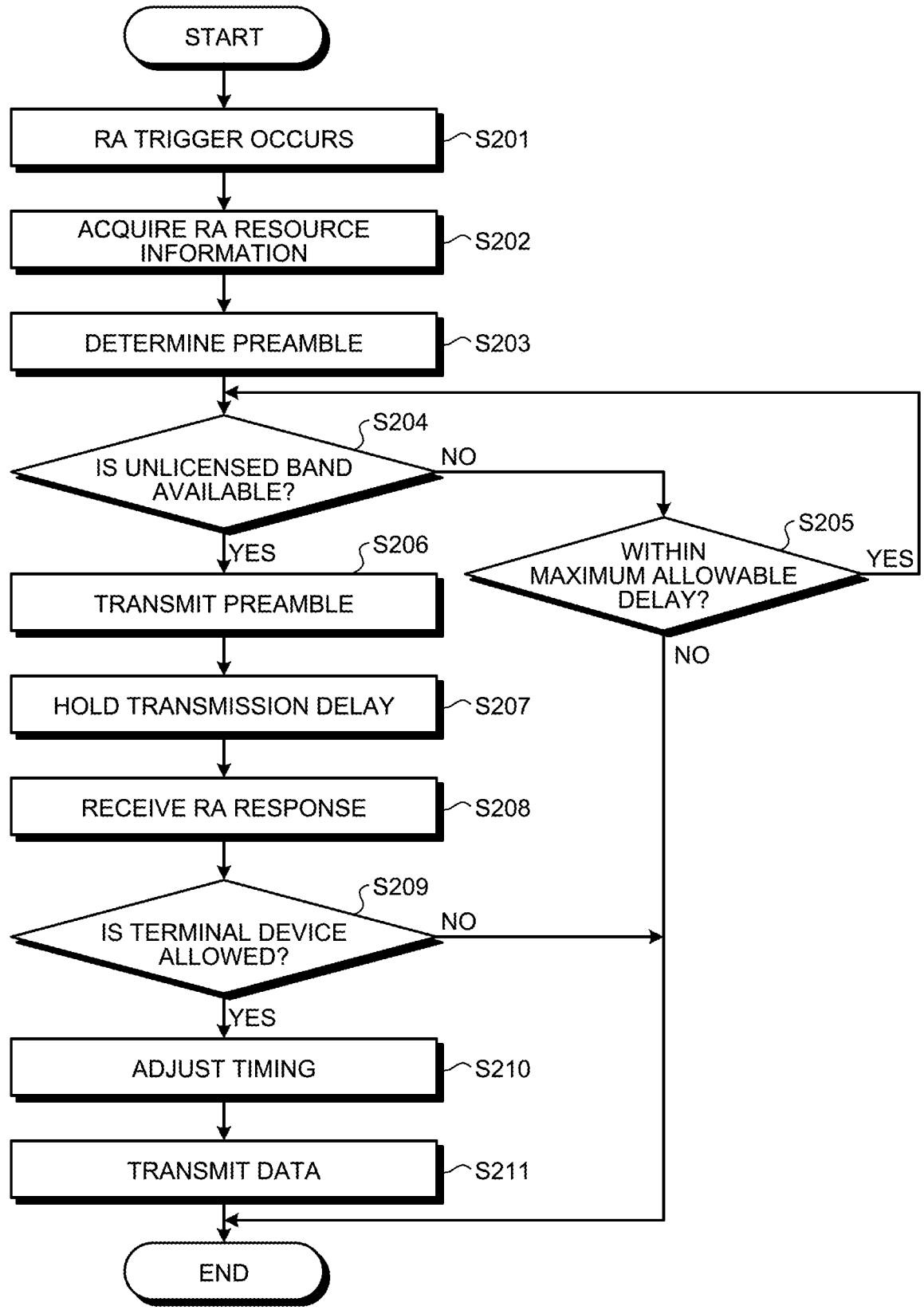
FIG. 6 is a flowchart that illustrates a random access process according to the first embodiment.

Next, with reference to the flowchart illustrated in FIG. 6, an explanation is given of operation of the terminal device 200 during random access.

For example, when a random access trigger (hereafter, referred to as "RA trigger") occurs, such as generation of data to be transmitted by using the uplink in an unlicensed band (Step S201), the RA-resource information acquiring unit 221 acquires RA resource information (Step S202). RA triggers include, for example, a start of wireless communication with a new base station device due to handover or requests for adjustment of timing advance as well as requests for scheduling of the uplink described above.

RA resource information acquired by the RA-resource information acquiring unit 221 includes the timing of an RA resource based on a downlink sub-frame including the RA resource information and the frequency of the RA resource. Furthermore, RA resource information may include the maximum allowable delay that is allowed after the beginning of an RA resource until the start of transmission of a preamble, a time interval between RA resources, or the like.

After the RA resource information is acquired, the preamble-transmission control unit 222 determines one preamble at random from preamble candidates (Step S203). Preamble candidates are previously notified from the base station device 100 by for example RRC signaling. The determined preamble is notified to the LBT processing unit 223, and transmission of the preamble using the RA resource is commanded.

In response to this command, the LBT processing unit 223 performs an LBT process to determine whether an unlicensed band is available in the timing of the RA resource (Step S204). Specifically, a reception process is performed on the unlicensed band, and it is determined whether the received power is equal to or more than a predetermined threshold. As a result of determination, if the received power is equal to or more than the predetermined threshold, it is determined that it is a busy state where the unlicensed band is being used by a different wireless communication system and the unlicensed band is not available (No at Step S204). In this case, it is determined whether the time elapsing from the beginning of the RA resource falls within the maximum allowable delay indicated by the RA resource information (Step S205). Then, if the maximum allowable delay is exceeded (No at Step S205), transmission of the preamble using the current RA resource is cancelled, and an LBT process is performed again in the timing of the subsequent RA resources.

Conversely, if the time elapsing from the beginning of the RA resource falls within the maximum allowable delay (Yes at Step S205), the LBT process is continuously performed, and it is determined whether the unlicensed band is in a busy state or an idle state. Then, if the idle state, where the received power of the unlicensed band is less than the predetermined threshold, continues for a predetermined time period, it is determined that the unlicensed band is available (Yes at Step S204). In this case, the preamble determined by the preamble-transmission control unit 222 is transmitted by using the frequency of the RA resource (Step S206). Here, as transmission of the preamble is started without exceeding the maximum allowable delay after the timing of the beginning of the RA resource, transmission of the preamble is completed within the time of the RA resource.

Simultaneously with transmission of the preamble, the transmission-delay holding unit 224 holds a transmission delay caused by the LBT process before transmission of the preamble is started (Step S207). As the transmission delay is different from a propagation delay that corresponds to the distance from the terminal device 200 to the base station device 100, it is subtracted from the time adjusted by timing advance.

After the preamble is transmitted, the base station device 100 selects the terminal device for which transmission is allowed from the terminal devices that have transmitted a preamble. Then, the selected terminal device is notified, and the RA response including the TA command is transmitted from the base station device 100. The RA response is received by the wireless unit 210 in the terminal device 200 (Step S208) and is acquired by the RA-response acquiring unit 225. The uplink-timing control unit 226 refers to the acquired RA response and determines whether the terminal device 200 is allowed to conduct transmission (Step S209).

If transmission by a different terminal device other than the terminal device 200 is allowed (No at Step S209), the terminal device 200 acquires RA resource information again and repeatedly performs the above-described process. Conversely, if transmission by the terminal device 200 is allowed (Yes at Step S209), the uplink-timing control unit 226 acquires the transmission delay that is held by the transmission-delay holding unit 224. Then, by the uplink-timing control unit 226, the transmission timing designated by the TA command included in the RA response is delayed by the transmission delay, and the timing is set as a transmission timing (Step S210). Thus, it is possible to set transmission timing by eliminating the effect of a transmission delay due to an LBT process out of relation to a propagation delay, and accurate timing advance is enabled.

Then, the uplink-timing control unit 226 transmits transmission data at the set transmission timing (Step S211), whereby a random access process is completed.

As described above, according to the present embodiment, the time and the frequency of an RA resource for transmitting a preamble are notified by using RA resource information, and the RA resource is allocated at a time based on a downlink sub-frame including the RA resource information. Therefore, without periodically allocating RA resources, the terminal device can transmit preambles, whereby random access may be conducted in an unlicensed band that is shared by wireless communication systems.

[b] Second Embodiment

A second embodiment is characterized in that it is determined whether delay of transmission of a preamble is allowed or not depending on an RA trigger that is a trigger for the start of random access.

As the configurations of the base station device and the terminal device according to the second embodiment are the same as those of the base station device 100 (FIG. 1) and the terminal device 200 (FIG. 3) according to the first embodiment, their explanations are omitted. According to the second embodiment, operation of the terminal device during random access is different from that in the first embodiment.

Figure 7:
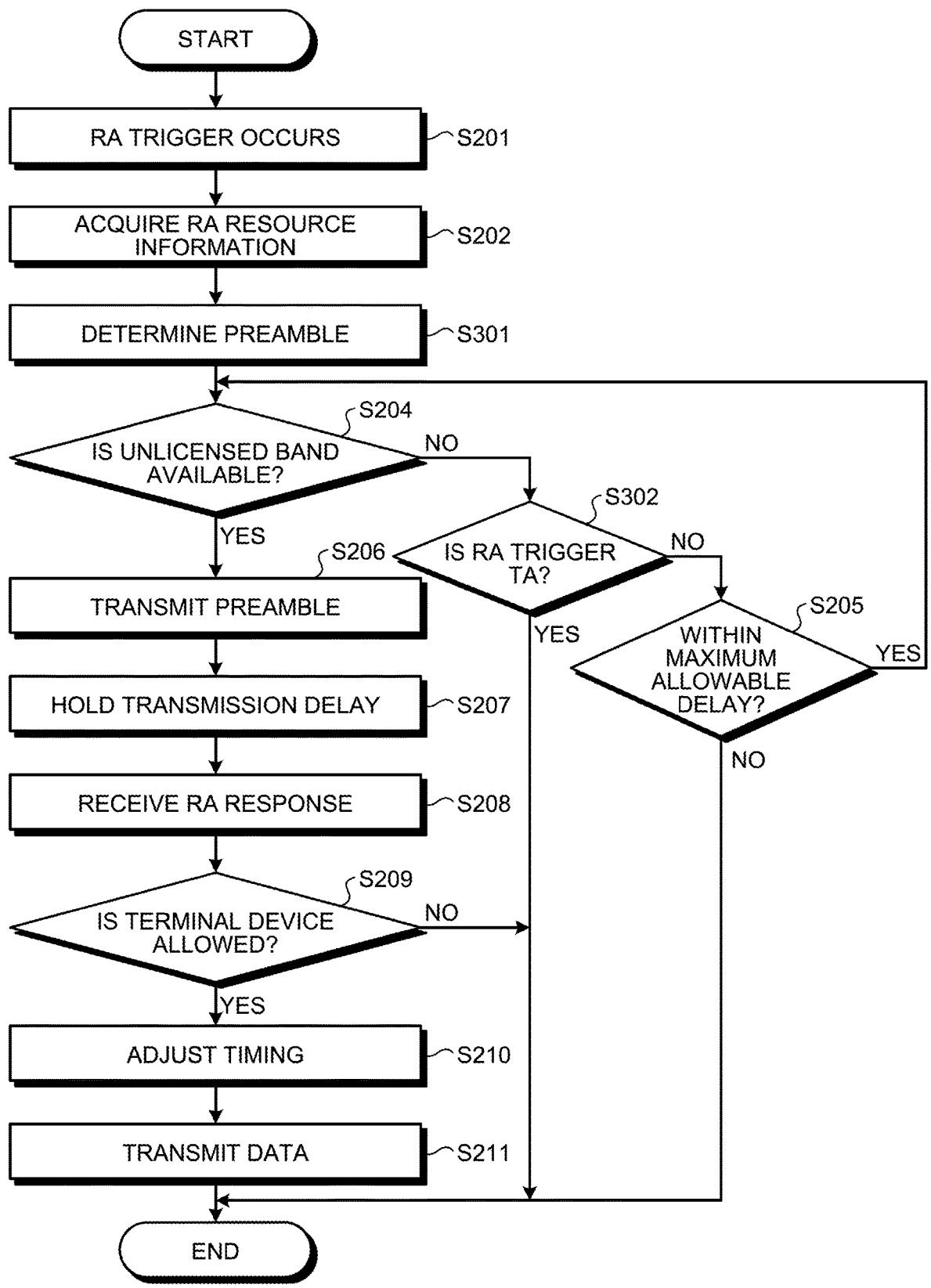
FIG. 7 is a flowchart that illustrates a random access process according to a second embodiment.

FIG. 7 is a flowchart that illustrates a random access process of the terminal device according to the second embodiment. In FIG. 7, the same parts as those in FIG. 6 are attached with the same reference numerals, and their detailed explanations are omitted.

For example, when an RA trigger occurs, such as generation of data to be transmitted by using the uplink in an unlicensed band (Step S201), the RA-resource information acquiring unit 221 acquires RA resource information (Step S202). RA triggers include, for example, a start of wireless communication with a new base station device due to handover or requests for adjustment of timing advance as well as requests for scheduling of the uplink described above.

After the RA resource information is acquired, the preamble-transmission control unit 222 determines one preamble at random from preamble candidates for each RA trigger (Step S301). That is, according to the present embodiment, preamble candidates are different depending on an RA trigger. For example, if the RA trigger is a request for timing advance adjustment, preambles with identification numbers 1 to 16 are used as preamble candidates, and if the RA trigger is a request for scheduling in the uplink, preambles with identification numbers 17 to 64 are used as preamble candidates. These types of preamble candidates are previously notified from the base station device by for example RRC signaling. Furthermore, when a preamble is determined by the preamble-transmission control unit 222, one preamble is selected from preamble candidates that correspond to an RA trigger.

The determined preamble is notified to the LBT processing unit 223, and transmission of the preamble using the RA resource is commanded. In response to this command, the LBT processing unit 223 performs an LBT process to determine whether an unlicensed band is available in the timing of the RA resource (Step S204). As a result, if it is determined that the unlicensed band is being used by a different wireless communication system, i.e., a busy state, and the unlicensed band is not available (No at Step S204), it is determined whether the RA trigger is a request for timing advance adjustment (Step S302).

Here, if random access is conducted for timing advance adjustment, an RA response including a TA command is transmitted from the base station device in accordance with a propagation delay before a preamble is received by the base station device. Therefore, it is preferable that the timing in which a preamble is transmitted from the terminal device is determined from the timing of the RA resource without including a transmission delay due to an LBT process. Specifically, as the base station device, which receives a preamble, does not distinguish between a transmission delay due to an LBT process and a propagation delay, it is preferable that the base station device knows the transmission delay before a preamble is transmitted.

Therefore, if an unlicensed band is not available and the RA trigger is a request for timing advance adjustment (Yes at Step S302), transmission of the preamble using the current RA resource is cancelled, and an LBT process is performed again in the timing of the subsequent RA resources. Thus, if the RA trigger is a request for timing advance adjustment, no uncertain transmission delay occurs due to an LBT process. As a result, the base station device is capable of accurately estimating a propagation delay of a preamble transmitted from the terminal device and is capable of including the TA command designating appropriate transmission timing in an RA response.

Conversely, as a result of determination at Step S302, if the RA trigger is not a request for timing advance adjustment (No at Step S302), it is determined whether the time elapsing from the beginning of the RA resource falls within the maximum allowable delay indicated by the RA resource information (Step S205). Then, if the maximum allowable delay is exceeded (No at Step S205), transmission of the preamble using the current RA resource is cancelled, and an LBT process is performed again in the timing of the subsequent RA resources.

Conversely, if the time elapsing from the beginning of the RA resource falls within the maximum allowable delay (Yes at Step S205), the LBT process is continuously performed, and it is determined whether the unlicensed band is in a busy state or an idle state. Then, if the idle state, where the received power of the unlicensed band is less than the predetermined threshold, continues for a predetermined time period, it is determined that the unlicensed band is available (Yes at Step S204). In this case, the preamble determined by the preamble-transmission control unit 222 is transmitted by using the frequency of the RA resource (Step S206).

Simultaneously with transmission of the preamble, the transmission-delay holding unit 224 holds a transmission delay caused by the LBT process before transmission of the preamble is started (Step S207). Then, the base station device selects the terminal device for which transmission is allowed from the terminal devices that have transmitted a preamble, notifies the selected terminal device, and transmits the RA response including the TA command. The RA response is received by the wireless unit 210 (Step S208) and is acquired by the RA-response acquiring unit 225. The uplink-timing control unit 226 refers to the acquired RA response and determines whether the terminal device is allowed to conduct transmission (Step S209).

If transmission by a different terminal device other than the terminal device is allowed (No at Step S209), RA resource information is acquired again and the above-described process is repeatedly performed. Conversely, if transmission by the terminal device is allowed (Yes at Step S209), the uplink-timing control unit 226 acquires the transmission delay that is held by the transmission-delay holding unit 224 and adjusts the transmission timing (Step S210). Then, the uplink-timing control unit 226 transmits transmission data at the adjusted transmission timing (Step S211), whereby a random access process is completed.

As described above, according to the present embodiment, if the RA trigger is a request for timing advance adjustment, a transmission delay due to an LBT process when a preamble is transmitted from the terminal device is not allowed, and if other RA triggers, a transmission delay within the maximum allowable delay is allowed. Therefore, if random access is conducted for timing advance adjustment, the base station device is capable of accurately estimating a propagation delay of a preamble and is capable of including the TA command designating appropriate transmission timing in an RA response.

[c] Third Embodiment

A third embodiment is characterized in that, if no RA response is received after the elapse of a predetermined time after a preamble is transmitted, subsequent preambles are transmitted by using multiple RA resources in a frequency direction.

As the configurations of the base station device and the terminal device according to the third embodiment are the same as those of the base station device 100 (FIG. 1) and the terminal device 200 (FIG. 3) according to the first embodiment, their explanations are omitted. According to the third embodiment, arrangement of RA resources is different from that in the first embodiment.

Figure 8:
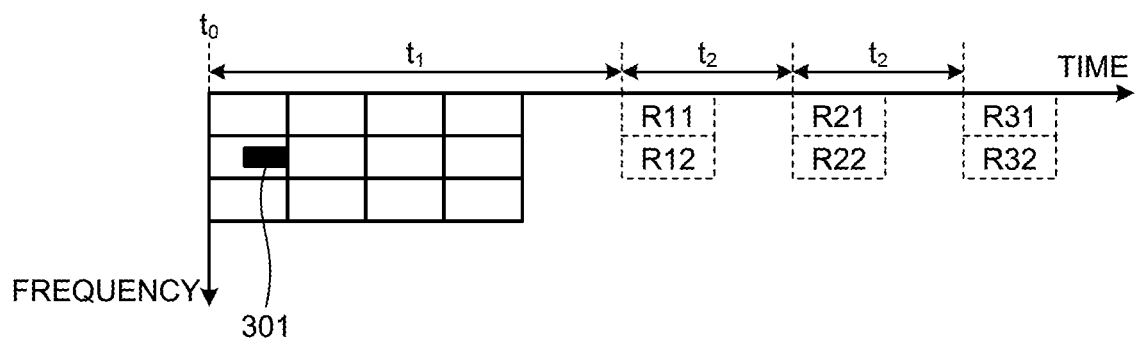
FIG. 8 is a diagram that illustrates a specific example of arrangement of RA resources according to a third embodiment.

FIG. 8 is a specific example of arrangement of RA resources according to the third embodiment. As illustrated in FIG. 8, RA resources R11, R12, R21, R22, R31, and R32 are allocated in frequencies within an unlicensed band in timings based on the time $t_0$ at the beginning of the subframe for transmitting RA resource information 301. In FIG. 8, the RA resources R11 and R12 are allocated after the time $t_1$ from the time $t_0$, and the RA resources R21, R22 and the RA resources R31, R32 are allocated with an interval of the time $t_2$ after the RA resources R11, R12, respectively. Furthermore, the RA resources R11, R12 are allocated in different frequencies at the same time. Similarly, the RA resources R21, R22 are also allocated in different frequencies at the same time, and the RA resources R31, R32 are also allocated in different frequencies at the same time.

As described above, multiple RA resources are arranged in a frequency direction; thus, for example, even if there is provision on the upper limit of a transmission power per frequency, the transmission power for preambles may be increased in keeping with the provision by transmitting an identical preamble with multiple RA resources. As a result, preambles may be received by a base station device without fail.

Figure 9:
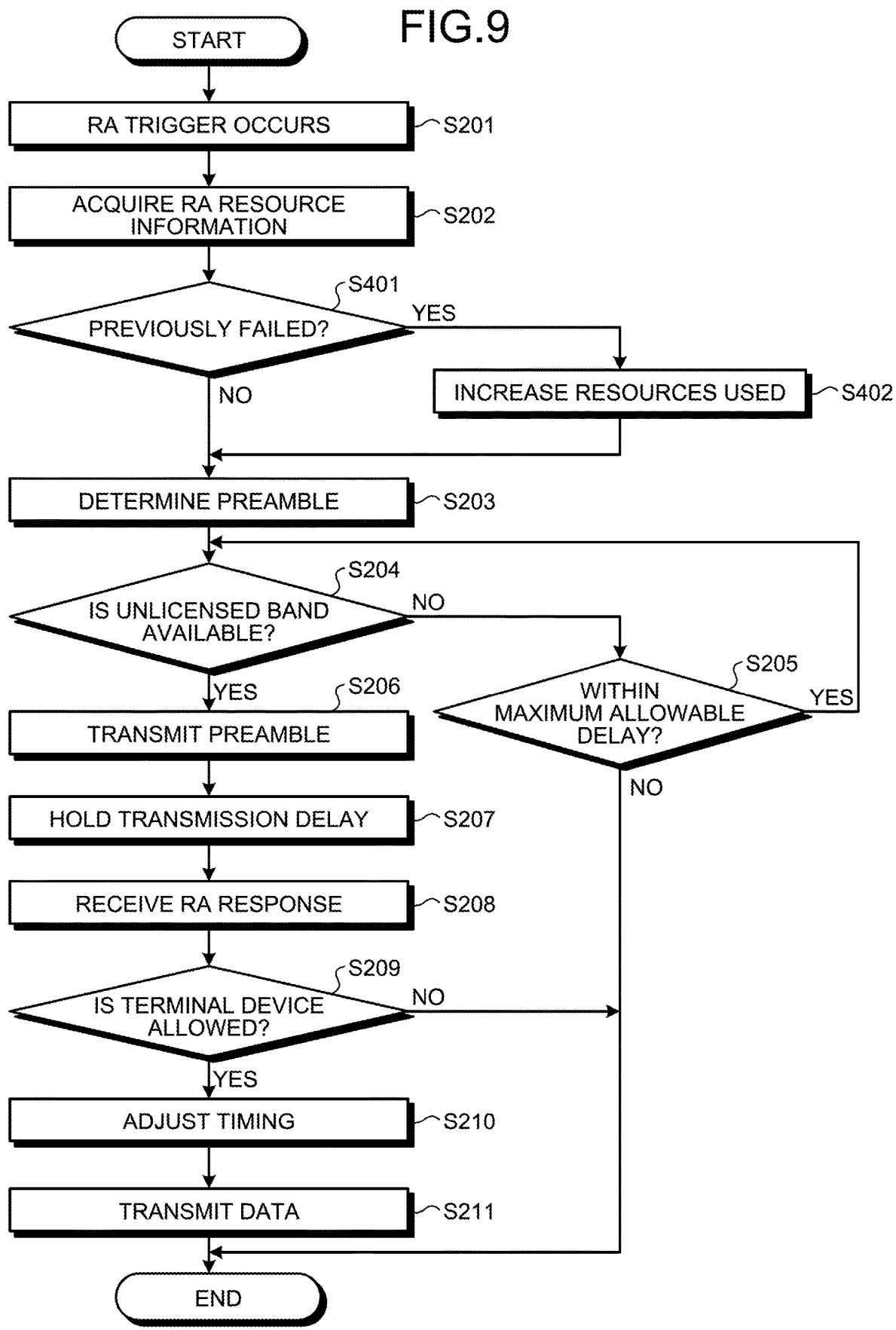
FIG. 9 is a flowchart that illustrates a random access process according to a third embodiment.

FIG. 9 is a flowchart that illustrates a random access process by the terminal device according to the third embodiment. In FIG. 9, the same parts as those in FIG. 6 are attached with the same reference numerals, and their detailed explanations are omitted.

For example, when an RA trigger occurs, such as generation of data to be transmitted by using the uplink in an unlicensed band (Step S201), the RA-resource information acquiring unit 221 acquires RA resource information (Step S202). After RA resource information is acquired, the preamble-transmission control unit 222 determines whether random access using the previous RA resource has failed (Step S401). Specifically, the preamble-transmission control unit 222 determines whether the current RA resource information has been acquired without receiving any RA response although a preamble has been already transmitted by using an RA resource.

As a result of determination, if the previous random access has failed (Yes at Step S401), the current RA resource information is referred to, and it is determined that the RA resources used becomes larger than that for the case where the random access failed (Step S402). Specifically, in arrangement of the RA resources illustrated in FIG. 8, for example, if the previous preamble transmission is conducted by using only the RA resource R11, it is determined that the RA resources R11, R12 are used for the current preamble transmission. In this way, if the previous random access has failed, it is determined that the current preamble transmission is conducted by simultaneously using multiple RA resources in a frequency direction. Therefore, even if there is provision on the upper limit of a transmission power per frequency, the transmission power of a preamble may be increased, and the preamble may be properly received by the base station device. As a result, RA responses may be transmitted from the base station device, and random access may be successful.

If the previous random access was successful (No at Step S401) or after the RA resources used are increased, the preamble-transmission control unit 222 determines one preamble at random from preamble candidates (Step S203). The determined preamble is notified to the LBT processing unit 223, and transmission of the preamble using the RA resource is commanded.

In response to the command, the LBT processing unit 223 performs an LBT process to determine whether an unlicensed band is available in the timing of the RA resource (Step S204). As a result, if it is determined that it is a busy state where an unlicensed band is being used by a different wireless communication system and the unlicensed band is not available (No at Step S204), it is determined whether the time elapsing from the beginning of the RA resource falls within the maximum allowable delay indicated by RA resource information (Step S205). Then, if the maximum allowable delay is exceeded (No at Step S205), transmission of the preamble using the current RA resource is cancelled, and an LBT process is performed again in the timing of the subsequent RA resources.

Conversely, if the time elapsing from the beginning of the RA resource falls within the maximum allowable delay (Yes at Step S205), the LBT process is continuously performed, and it is determined whether the unlicensed band is in a busy state or an idle state. Then, if the idle state, where the received power of the unlicensed band is less than the predetermined threshold, continues for a predetermined time period, it is determined that the unlicensed band is available (Yes at Step S204). In this case, the preamble determined by the preamble-transmission control unit 222 is transmitted by using the frequency of the RA resource (Step S206). Here, the number of RA resources used for transmission of a preamble is different depending on whether the previous random access failed. That is, if the previous random access failed, a preamble is transmitted by simultaneously using more RA resources than those for the previous random access.

Simultaneously with transmission of the preamble, the transmission-delay holding unit 224 holds a transmission delay caused by the LBT process before transmission of the preamble is started (Step S207). Then, the base station device selects the terminal device for which transmission is allowed from the terminal devices that have transmitted a preamble, notifies the selected terminal device, and transmits the RA response including the TA command. The RA response is received by the wireless unit 210 (Step S208) and is acquired by the RA-response acquiring unit 225. The uplink-timing control unit 226 refers to the acquired RA response and determines whether the terminal device is allowed to conduct transmission (Step S209).

If transmission by a different terminal device other than the terminal device is allowed (No at Step S209), RA resource information is acquired again and the above-described process is repeatedly performed. Conversely, if transmission by the terminal device is allowed (Yes at Step S209), the uplink-timing control unit 226 acquires the transmission delay that is held by the transmission-delay holding unit 224 and adjusts the transmission timing (Step S210). Then, the uplink-timing control unit 226 transmits transmission data in the adjusted transmission timing (Step S211), whereby a random access process is completed.

As described above, according to the present embodiment, if the previous random access failed, a preamble is transmitted by simultaneously using more RA resources than those for the previous. Therefore, even if there is provision on the upper limit of a transmission power per frequency, the transmission power for preambles may be increased, and the base station device may properly receive preambles. As a result, RA responses may be transmitted from the base station device and random access may be successful.

[d] Fourth Embodiment

A fourth embodiment is characterized in that the base station device transmits a trigger signal if an unlicensed band is available as a result of an LBT process and the terminal device transmits a preamble in timing based on the timing of the trigger signal.

Figure 10:
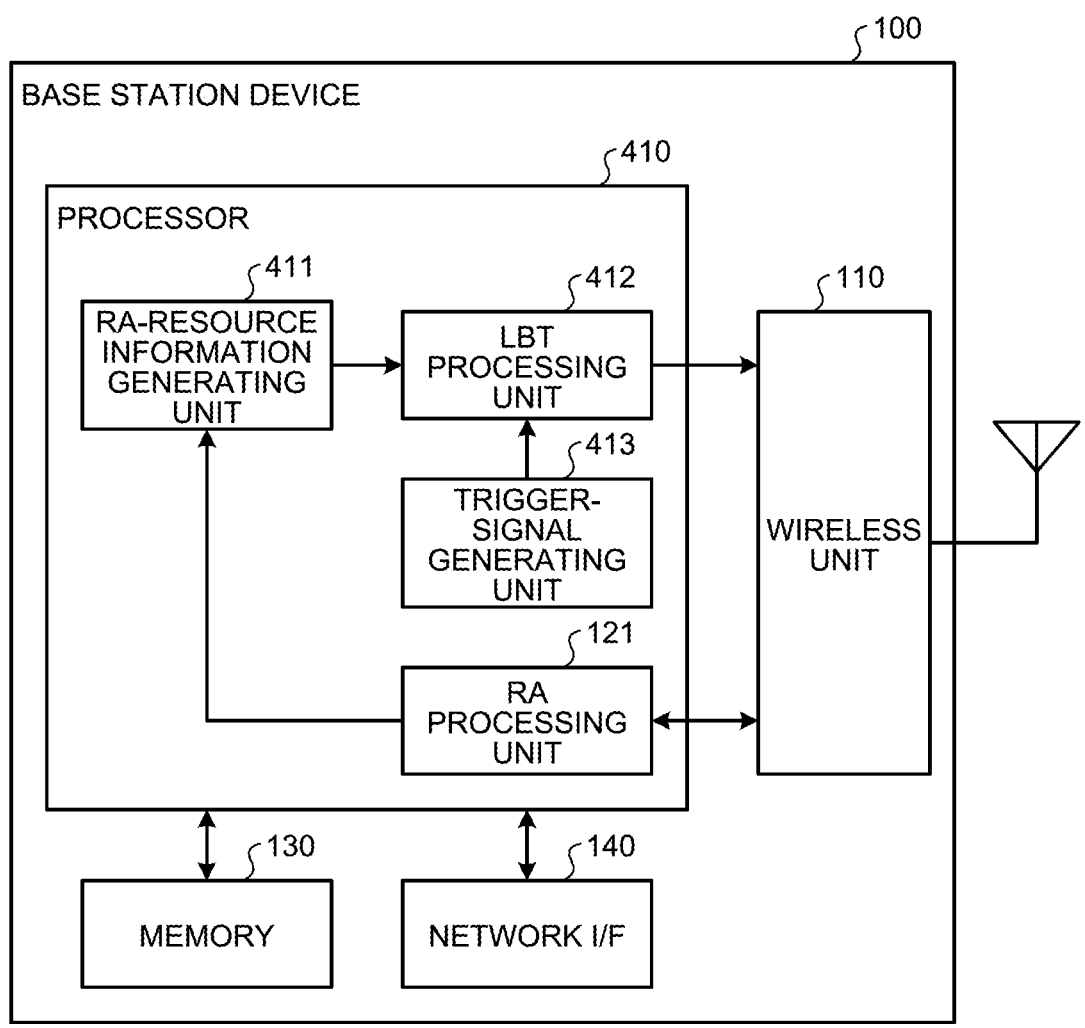
FIG. 10 is a block diagram that illustrates a configuration of a base station device according to a fourth embodiment.

FIG. 10 is a block diagram that illustrates a configuration of the base station device 100 according to the fourth embodiment. In FIG. 10, the same parts as those in FIG. 1 are attached with the same reference numerals, and their explanations are omitted. The base station device 100 illustrated in FIG. 10 includes a processor 410 instead of the processor 120 in the base station device 100 illustrated in FIG. 1.

The processor 410 includes, for example, a CPU, FPGA, or DSP, and it performs overall control on the wireless unit 110, the memory 130, and the network I/F 140. Furthermore, the processor 410 performs a random access process in an unlicensed band. Specifically, the processor 410 includes the RA processing unit 121, an RA-resource information generating unit 411, an LBT processing unit 412, and a trigger-signal generating unit 413.

The RA-resource information generating unit 411 generates RA resource information in accordance with a command from the RA processing unit 121. Specifically, the RA-resource information generating unit 411 generates RA resource information that gives a command to transmit a preamble in the timing in which a trigger signal is received and that indicates the frequency used for transmission of a preamble in an unlicensed band. Furthermore, the RA-resource information generating unit 411 may generate RA resource information that specifies the type of trigger signal that corresponds to transmission of a preamble. Specifically, if there are types of trigger signals, such as a trigger signal that serves as a trigger for transmission of data or a trigger signal that serves as a trigger for transmission of a preamble, the RA-resource information generating unit 411 may generate RA resource information that specifies a trigger signal that serves as a trigger for transmission of a preamble.

After the RA-resource information generating unit 411 generates RA resource information, the LBT processing unit 412 performs an LBT process to check availability of an unlicensed band. Specifically, the LBT processing unit 412 performs a reception process on an unlicensed band to determine whether the received power is equal to or less than the predetermined threshold. Then, if the received power is continuously equal to or less than the predetermined threshold during more than a predetermined time period, the LBT processing unit 412 determines that an unlicensed band is available and transmits RA resource information with a downlink sub-frame. Furthermore, if an unlicensed band is already being used by the wireless communication system to which the base station device 100 belongs, the LBT processing unit 412 may transmit RA resource information without performing LBT.

Furthermore, after the RA resource information is transmitted, the LBT processing unit 412 performs an LBT process in accordance with a command from the trigger-signal generating unit 413. Then, if it is determined that an unlicensed band is available, the LBT processing unit 412 transmits the trigger signal generated by the trigger-signal generating unit 413. That is, if it is determined that the unlicensed band can be occupied by the wireless communication system to which the base station device 100 belongs, the LBT processing unit 412 transmits a trigger signal that serves as a trigger for transmission of a preamble.

After the LBT processing unit 412 transmits RA resource information, the trigger-signal generating unit 413 generates a trigger signal. Then, the trigger-signal generating unit 413 gives a command to the LBT processing unit 412 so as to transmit the generated trigger signal. As the trigger signal is a trigger for transmission of a preamble, an RA resource is arranged immediately after the trigger signal. That is, the trigger signal is one of the resource specifying signals to specify an RA resource. The trigger-signal generating unit 413 may generate different types of trigger signals, such as a trigger signal that serves as a trigger for transmission of data or a trigger signal that serves as a trigger for transmission of a preamble. Furthermore, the trigger-signal generating unit 413 may generate a single trigger signal that is transmitted separately from other signals or may generate for example a trigger signal that is simultaneously transmitted with other pieces of control information, or the like.

Figure 11A:
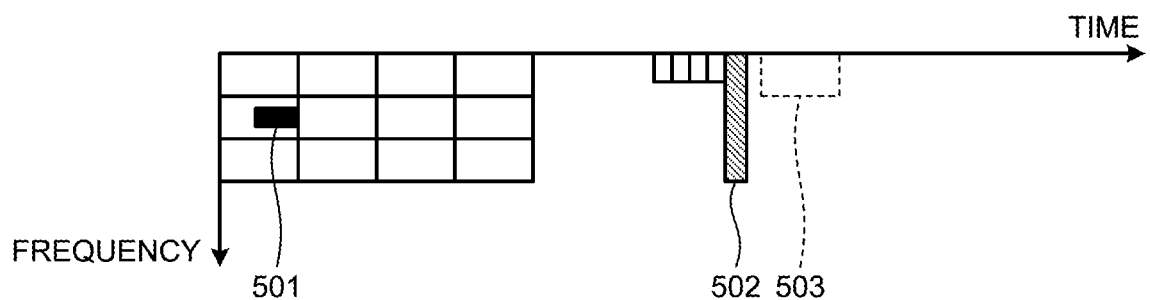
FIG. 11A is a diagram that illustrates a specific example of a trigger signal.
Figure 11B:
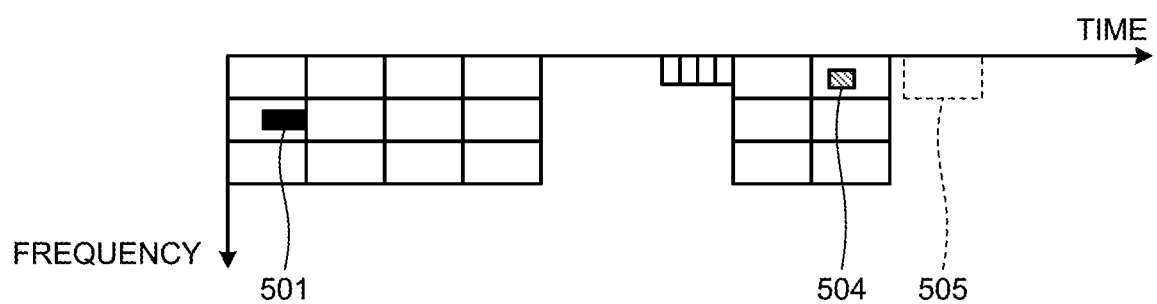
FIG. 11B is a diagram that illustrates a specific example of a trigger signal.

Here, with reference to FIG. 11, a specific example of the trigger signal is explained. FIG. 11(*a*) is a diagram that illustrates an example of a single trigger signal. As illustrated in FIG. 11(*a*), after RA resource information 501 is transmitted, the trigger-signal generating unit 413 generates a single trigger signal 502. Then, the trigger signal 502 is transmitted if the LBT processing unit 412 determines that an unlicensed band is available, and an RA resource 503 is arranged in timing based on the trigger signal 502. The time interval between the trigger signal 502 and the RA resource 503 is an extremely short time, e.g., about several μs to several dozens of μs. It is preferable to use, as the trigger signal 502 that is transmitted alone as described above, the same sequence as synchronization signals of for example Zadoff-Chu sequence or M-sequence.

Furthermore, FIG. 11(*b*) is a diagram that illustrates an example of the trigger signal that is simultaneously transmitted with other pieces of control information, or the like. As illustrated in FIG. 11(*b*), after the RA resource information 501 is transmitted, the trigger-signal generating unit 413 generates an encoded and modulated trigger signal 504 together with other pieces of control information. Then, the trigger signal 504 is transmitted in a sub-frame together with other pieces of control information if the LBT processing unit 412 determines that an unlicensed band is available, and an RA resource 505 is arranged in timing based on the downlink burst signal including the trigger signal 504. The time interval between the burst signal including the trigger signal 504 and the RA resource 505 is an extremely short time, e.g., about several μs to several dozens of μs.

Figure 12:
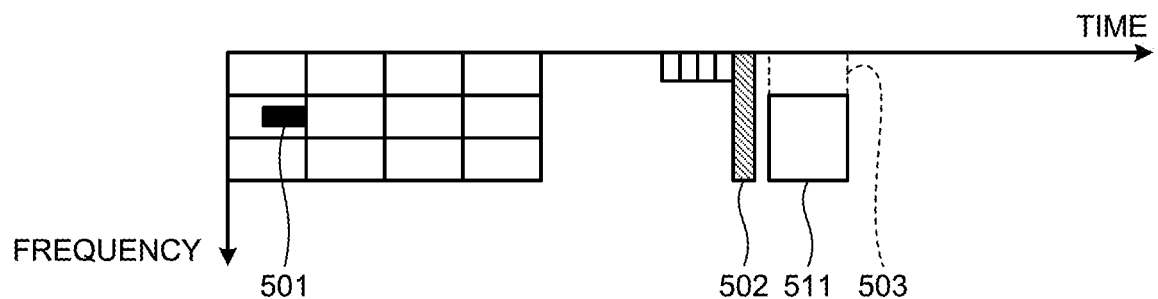
FIG. 12 is a diagram that illustrates a specific example of an up signal.

Here, in FIGS. 11(*a*), (*b*), the RA resources 503, 505 are arranged alone; however, data and other pieces of control information may be simultaneously transmitted by using frequencies that are not used for RA resources. Specifically, as illustrated in FIG. 12, for example, the RA resource 503 may be arranged immediately after the trigger signal 502 and uplink data 511 may be transmitted at a different frequency from that of the RA resource 503. In this case, the type of the trigger signal 502 may indicate whether data or other pieces of control information are allowed to be transmitted, or the type of the trigger signal 502 that allows transmission of data or other pieces of control information may be identified by using the RA resource information 501.

Figure 13:
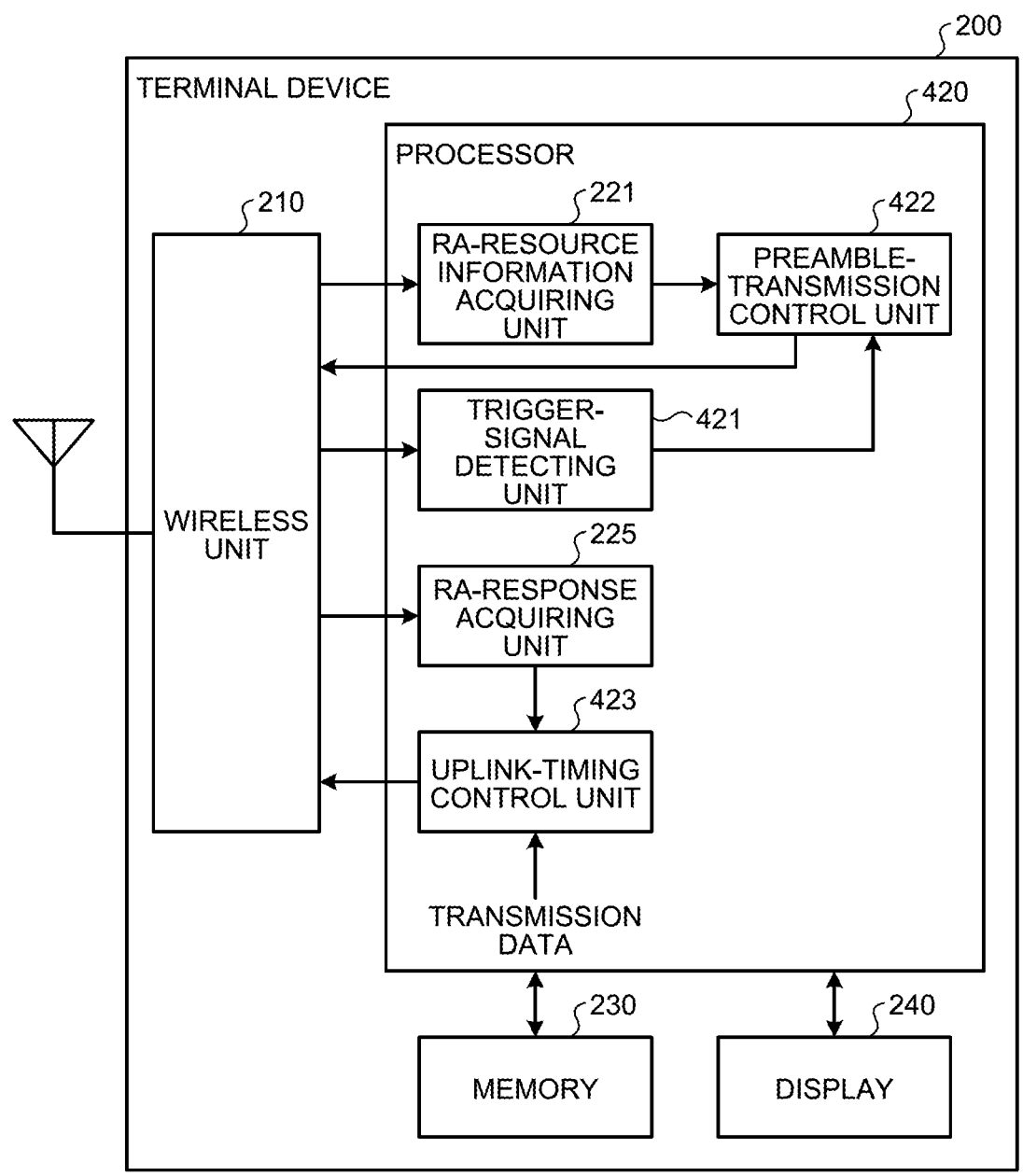
FIG. 13 is a block diagram that illustrates a configuration of a terminal device according to the fourth embodiment.

FIG. 13 is a block diagram that illustrates a configuration of the terminal device 200 according to the fourth embodiment. In FIG. 13, the same parts as those in FIG. 3 are attached with the same reference numerals, and their explanations are omitted. The terminal device 200 illustrated in FIG. 13 includes a processor 420 instead of the processor 220 in the terminal device 200 illustrated in FIG. 3.

The processor 420 includes, for example, a CPU, FPGA, or DSP, and it performs overall control on the wireless unit 210, the memory 230, and the display 240. Furthermore, the processor 420 performs a random access process in an unlicensed band. Specifically, the processor 420 includes the RA-resource information acquiring unit 221, a trigger-signal detecting unit 421, a preamble-transmission control unit 422, the RA-response acquiring unit 225, and an uplink-timing control unit 423.

The trigger-signal detecting unit 421 monitors signals in an unlicensed band, transmitted from the base station device 100, and detects a trigger signal from signals in the unlicensed band. Specifically, if a trigger signal is transmitted alone, the trigger-signal detecting unit 421 calculates correlation between a known trigger signal sequence and a signal in the unlicensed band, thereby detecting a trigger signal.

Furthermore, if a trigger signal is transmitted together with other pieces of control information, or the like, the trigger-signal detecting unit 421 demodulates and decodes a signal in the unlicensed band, thereby detecting a trigger signal.

The preamble-transmission control unit 422 controls transmission of a preamble for random access in accordance with RA resource information acquired by the RA-resource information acquiring unit 221. Specifically, the preamble-transmission control unit 422 selects one preamble at random from preamble candidates that are notified by for example RRC signaling. Then, the preamble-transmission control unit 422 transmits the selected preamble by using the RA resource allocated in the frequency indicated by the RA resource information in timing based on the timing in which the trigger-signal detecting unit 421 detects the trigger signal. Specifically, the preamble-transmission control unit 422 transmits a preamble without performing an LBT process immediately after a trigger signal is detected.

The uplink-timing control unit 423 refers to the RA response by using the RA-response acquiring unit 225 to determine whether transmission by the terminal device 200 is allowed and, if transmission is allowed, controls the timing in which transmission data is transmitted. Specifically, the uplink-timing control unit 423 acquires a TA command included in an RA response and transmits transmission data at the transmission timing specified by the TA command. That is, according to the present embodiment, as the terminal device 200 does not perform an LBT process, a transmission delay due to an LBT process does not occur during transmission of a preamble. Therefore, TA commands generated by the base station device 100 designate appropriate transmission timing to which only the propagation delay of a preamble is applied. Thus, the uplink-timing control unit 423 transmits transmission data at the transmission timing that follows a TA command.

Figure 14:
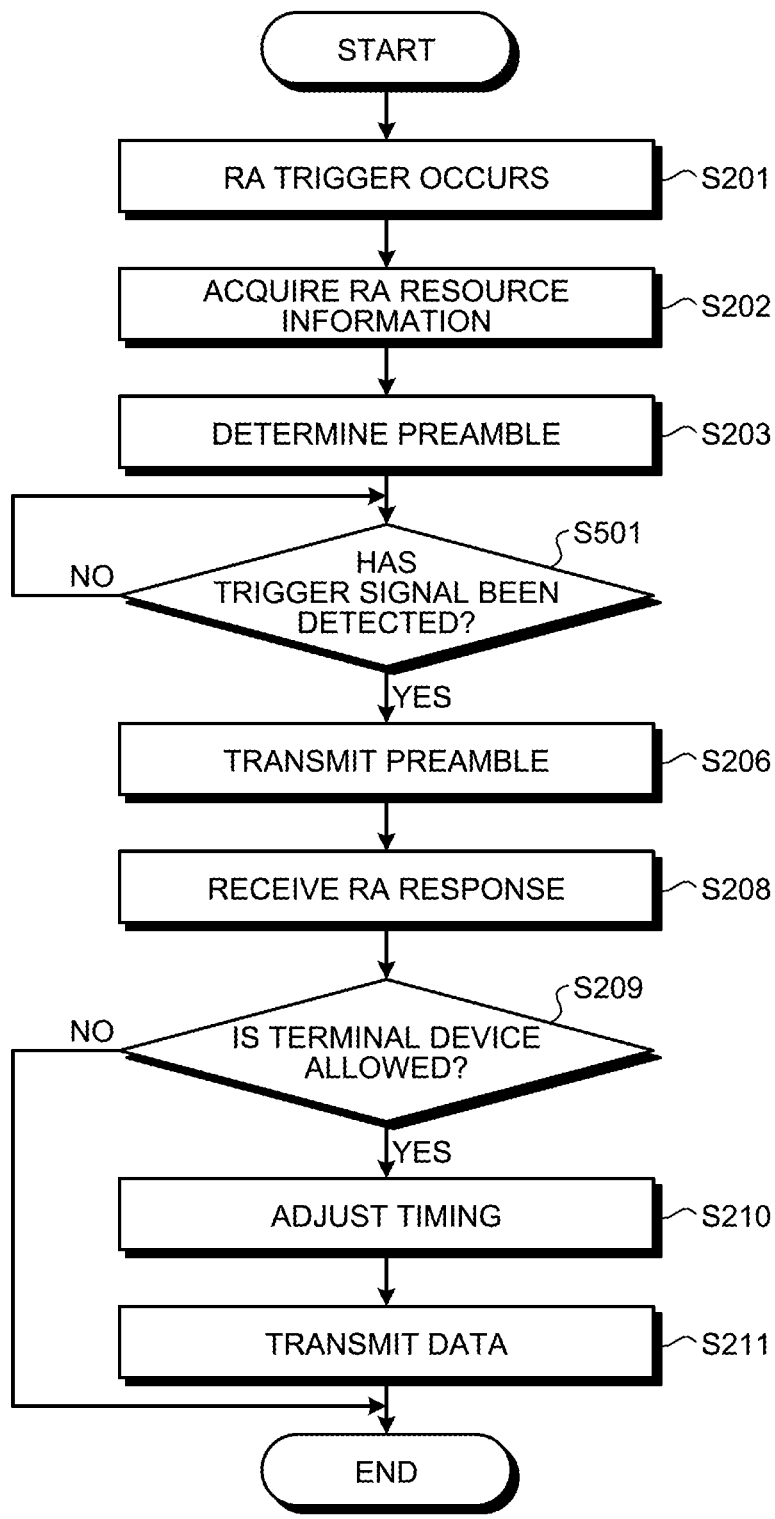
FIG. 14 is a flowchart that illustrates a random access process according to the fourth embodiment.

FIG. 14 is a flowchart that illustrates a random access process of the terminal device 200 according to the fourth embodiment. In FIG. 14, the same parts as those in FIG. 6 are attached with the same reference numerals, and their detailed explanations are omitted.

For example, when an RA trigger occurs, such as generation of data to be transmitted by using the uplink in an unlicensed band (Step S201), the RA-resource information acquiring unit 221 acquires RA resource information (Step S202). RA triggers include, for example, a start of wireless communication with a new base station device due to handover or requests for adjustment of timing advance as well as requests for scheduling of the uplink described above.

After the RA resource information is acquired, the preamble-transmission control unit 222 determines one preamble at random from preamble candidates (Step S203). Then, the trigger-signal detecting unit 421 monitors signals in an unlicensed band and determines whether a trigger signal has been detected (Step S501). Specifically, the trigger-signal detecting unit 421 determines whether a trigger signal has been detected by calculating the correlation between a reception signal in an unlicensed band and a predetermined sequence, demodulating and decoding a reception signal, or the like. Then, a stand-by state continues until a trigger signal is detected (No at Step S501).

After a trigger signal is detected (Yes at Step S501), the preamble-transmission control unit 422 transmits the determined preamble by using the frequency of the RA resource (Step S206). That is, the time of the RA resource is based on the trigger signal, and the frequency of the RA resource is indicated by the RA resource information. The time interval from detection of a trigger signal to an RA resource is an extremely short time, e.g., about several µs to several dozens of µs, and the unlicensed band does not get occupied by a different wireless communication system during the interval.

The base station device selects the terminal device for which transmission is allowed from the terminal devices that have transmitted a preamble, notifies the selected terminal device, and transmits the RA response including the TA command. The RA response is received by the wireless unit 210 (Step S208) and is acquired by the RA-response acquiring unit 225. The uplink-timing control unit 423 refers to the acquired RA response and determines whether the terminal device 200 is allowed to conduct transmission (Step S209).

If transmission by a different terminal device other than the terminal device 200 is allowed (No at Step S209), RA resource information is acquired again and the above-described process is repeatedly performed. Conversely, if transmission by the terminal device 200 is allowed (Yes at Step S209), the uplink-timing control unit 423 adjusts the transmission timing in accordance with the TA command included in the RA response (Step S210). Then, the uplink-timing control unit 423 transmits transmission data at the adjusted transmission timing (Step S211), whereby a random access process is completed.

As described above, according to the present embodiment, the base station device performs an LBT process and transmits a trigger signal after RA resource information is transmitted, and the terminal device transmits a preamble by using the RA resource that is arranged immediately after the trigger signal. Therefore, the terminal device does not need to perform an LBT process, and uncertain transmission delay due to an LBT process does not occur during transmission of a preamble. As a result, processing loads on the terminal device may be reduced, and proper timing advance adjustment may be conducted.

According to an aspect of the terminal device, the base station device, the wireless communication system, and the wireless communication method disclosed in the present application, there is an advantage such that random access may be conducted in an unlicensed band shared by wireless communication systems.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A terminal device comprising:
a processor; and
a memory connected to the processor, wherein
the processor executes a process comprising:
receiving a resource specifying signal that includes resource information specifying a frequency in an unlicensed frequency band to transmit a preamble for random access, and a trigger signal that indicates allowance for transmission of the preamble;
selecting one preamble from a plurality of preamble candidates previously acquired; and
transmitting the preamble selected by using a random access resource based on the resource information, wherein the resource specifying signal includes the resource information on a plurality of random access resources that are arranged at an identical time and that have different frequencies, and
the transmitting includes:
determining whether there is a response to a preamble previously transmitted by using the random access resource; and upon determining that there is no response, transmitting the preamble selected by using more random access resources than previously used random access resources.

2. The terminal device according to claim 1, wherein the transmitting includes:
   upon not having successfully detected the trigger signal, determining whether the random access is started by using a request for adjustment of transmission timing by the terminal device as a trigger; and
   upon determining that the request for adjustment of transmission timing is the trigger, cancelling transmission of the preamble selected and, upon determining that the request for adjustment of transmission timing is not the trigger, repeatedly determining whether the trigger signal is successfully detected until the maximum allowable delay has elapsed.

3. The terminal device according to claim 1, wherein the process further comprises:
   storing a transmission delay from beginning of the random access resource to actual transmission of the preamble;
   receiving a response to the preamble indicating that transmission from the terminal device is allowed; and
   adjusting transmission timing of data based on the transmission delay stored and the response received.

4. The terminal device according to claim 1, wherein the transmitting is performed after having successfully detected the trigger signal.

5. A base station device comprising:
   a processor; and
   a memory connected to the processor, wherein
   the processor executes a process comprising:
      generating a resource specifying signal that includes resource information specifying a frequency in an unlicensed frequency band to transmit a preamble for random access;
      transmitting the resource specifying signal generated;
      determining whether a frequency band that is targeted for the random access is occupiable by a wireless communication system to which the base station device belongs;
      transmitting a trigger signal that indicates allowance for transmission of the preamble upon determining that the frequency band is occupiable; and
      receiving the preamble from a terminal device, wherein
      the resource specifying signal includes the resource information on a plurality of random access resources that are arranged at an identical time and that have different frequencies, and wherein
   the preamble of the receiving of the preamble was transmitted by the terminal device by using more random access resources than previously used to transmit a preamble to which there was no response.

6. A wireless communication system comprising:
   a base station device; and
   a terminal device, wherein
   the base station device includes a first processor and a first memory connected to the first processor,
   the first processor executes a process comprising:
      generating a resource specifying signal that includes resource information specifying a frequency in an unlicensed frequency band to transmit a preamble for random access;
      transmitting the resource specifying signal generated;
      determining whether a frequency band that is targeted for the random access is occupiable by a wireless communication system to which the base station device belongs; and
      transmitting a trigger signal that indicates allowance for transmission of the preamble upon determining that the frequency band is occupiable,
   the terminal device includes a second processor and a second memory connected to the second processor,
   the second processor executes a process comprising:
      receiving the resource specifying signal and the trigger signal;
      selecting one preamble from a plurality of preamble candidates previously acquired; and
      transmitting the preamble selected by using the random access resource based on the resource information, wherein
   the resource specifying signal includes the resource information on a plurality of random access resource that are arranged at an identical time and that have different frequencies, and
   the transmitting includes:
      determining whether there is a response to a preamble previously transmitted by using the random access resource; and
      upon determining that there is no response, transmitting the preamble selected by using more random access resources than previously used random access resources.

7. A wireless communication method comprising:
   receiving a resource specifying signal that includes resource information specifying a frequency in an unlicensed frequency band to transmit a preamble for random access, and a trigger signal that indicates allowance for transmission of the preamble;
   selecting one preamble from a plurality of preamble candidates previously acquired; and
   transmitting the preamble selected by using a random access resource based on the resource information, wherein
   the resource specifying signal includes the resource information on a plurality of random access resource that are arranged at an identical time and that have different frequencies, and
   the transmitting includes:
   determining whether there is a response to a preamble previously transmitted by using the random access resource; and
   upon determining that there is no response, transmitting the preamble selected by using more random access resources than previously used random access resources.

8. A wireless communication method executed by a base station device, the wireless communication method comprising:
   generating a resource specifying signal that includes resource information specifying a frequency in an unlicensed frequency band to transmit a preamble for random access;
   transmitting the resource specifying signal generated;
   determining whether a frequency band that is targeted for the random access is occupiable by a wireless communication system to which the base station device belongs;
   transmitting a trigger signal that indicates allowance for transmission of the preamble upon determining that the frequency band is occupiable; and receiving the preamble from a terminal device, wherein the resource specifying signal includes the resource information on a plurality of random access resource that are arranged at an identical time and that have different frequencies, and wherein the preamble of the receiving of the preamble was transmitted by the terminal device by using more random access resources than previously used to transmit a preamble to which there was no response.

* * * * *